United States Patent [19]

Fantone

[11] Patent Number: 4,627,690
[45] Date of Patent: Dec. 9, 1986

[54] OPTICAL SYSTEM WITH ANAMORPHIC PRISM

[75] Inventor: Stephen D. Fantone, Saugus, Mass.

[73] Assignee: Polaroid Corporation, Cambridge, Mass.

[21] Appl. No.: 709,921

[22] Filed: Mar. 8, 1985

[51] Int. Cl.⁴ .............................................. G02B 13/10
[52] U.S. Cl. ...................................... 350/421; 350/286
[58] Field of Search ................................ 350/286, 421

[56] References Cited

U.S. PATENT DOCUMENTS

| | | | |
|---|---|---|---|
| 2,792,751 | 5/1957 | Coleman | 350/286 |
| 2,896,498 | 7/1959 | Brandon | 350/286 |
| 4,093,964 | 6/1978 | Aughton | 358/302 |
| 4,128,308 | 12/1978 | McNaney | 350/286 |
| 4,214,813 | 7/1980 | McNaney | 350/152 |
| 4,333,173 | 6/1982 | Yonezawa et al. | 369/45 |
| 4,344,671 | 8/1982 | Lang | 350/174 |
| 4,580,879 | 4/1986 | Wilson | 350/421 |

*Primary Examiner*—John K. Corbin
*Assistant Examiner*—Rebecca D. Gass
*Attorney, Agent, or Firm*—Edward S. Roman

[57] ABSTRACT

An optical system for affecting the anamorphic compression or expansion of a light beam includes at least one optical prismatic element structured to twice affect the total internal reflection of an incident input light beam and the refraction of the exiting output light beam such that the direction of the exiting output light beam is substantially parallel to the direction of the incident input light beam.

8 Claims, 3 Drawing Figures

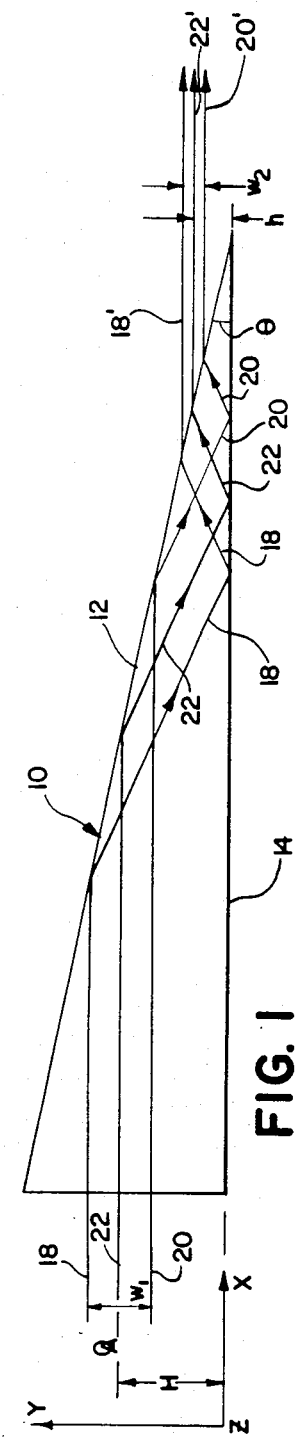
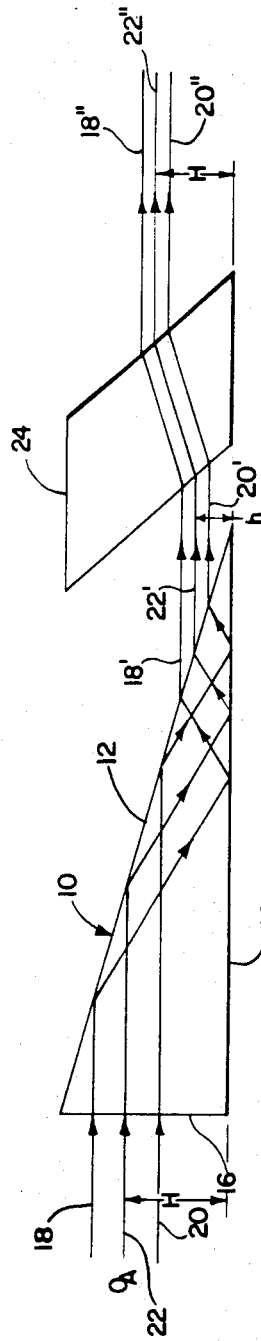
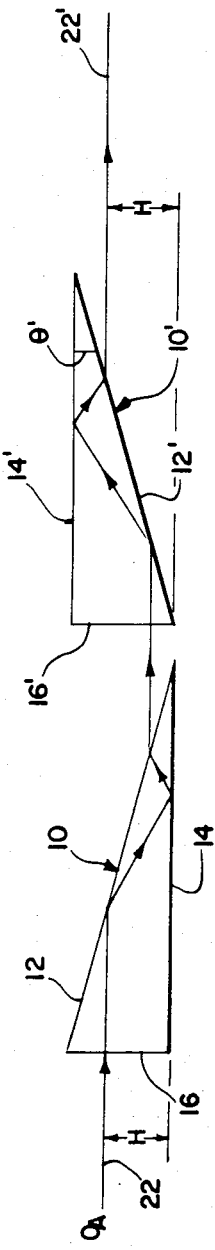
FIG. 1
FIG. 2
FIG. 3

OPTICAL SYSTEM WITH ANAMORPHIC PRISM

BACKGROUND OF THE INVENTION

1. Field of the Invention

This invention relates generally to an optical system with an anamorphic prism and, more particularly, to an optical system with an anamorphic prism in which light is at least twice totally internally reflected and then refracted.

2. Description of the Prior Art

Optical systems comprising anamorphic prisms are well known in the art as disclosed in U.S. Pat. Nos. 4,093,964, entitled "Image Reproducing Systems", by J. Aughton, issued June 6, 1978 and 4,016,504, entitled "Optical Beam Expander for Dye Laser", by Gary Klauminzer, issued Apr. 5, 1977. The optical systems of the aforementioned patents each comprise two spaced apart prisms for anamorphic light beam compression. Anamorphic compression is accomplished by the refraction of light as the light beam exits from each prism thereby requiring a minimum of at least two prisms to ensure that the light beam exits in a direction substantially parallel to the direction of the input light beam. Other light beam compressing systems such as disclosed in U.S. Pat. No. 4,214,813, entitled "Prismatic Light Beam Expander or Compressor Means", by J. McNaney, have utilized complex shaped optical elements having both light reflecting and light refracting surfaces. The complex shaped optical member 10 of McNaney accomplishes anamorphic light beam compression or expansion by directing the light beam through a spiral path by a plurality of succeeding internal reflections and refractions. Thus, although McNaney manages to accomplish anamorphic light beam compression utilizing a single optical element where the exiting output light beam is substantially parallel to the incident input light beam, his single optical element is of such complex shape that the difficulty and expense of manufacture would provide no advantage over the previously discussed two prism element anamorphic optical compression systems.

Therefore, it is a primary object of this invention to provide a simple and economical optical system for affecting anamorphic light beam compression or expansion utilizing only a single optical prism from which the output light beam may exit in a direction substantially parallel to the incident input light beam.

It is a further object of this invention to provide an optical system for affecting anamorphic light beam compression or expansion utilizing only a simple prismatic optical element structured to affect both total internal reflection of the incident light beam as well as refraction of the exiting output light beam.

Other objects of the invention will be in part obvious and will in part appear hereinafter. The invention accordingly comprises a mechanism and system possessing the construction, combination of elements and arrangement of parts which are exemplified in the following detailed disclosure.

SUMMARY OF THE INVENTION

An optical system is provided for affecting changes in the cross-sectional dimension of a beam of light along one of two mutually perpendicular cross-sectional axes. The optical system comprises at least one optical prism having first and second substantially planar polished surfaces inclined to one another at an acute angle. The acute angle is subtended by a third substantially planar polished surface positioned to receive the incident input beam of light. The first planar surface is inclined with respect to the third planar surface such that the beam of light incident to the third planar surface thereafter impinges upon the first planar surface at an angle of incidence at least equal to or greater than the critical angle of incidence so as to be internally reflected therefrom. The second substantially planar surface is inclined with respect to the first and third substantially planar surfaces such that the beam of light internally reflected by the first planar surface thereafter impinges upon the second planar surface at an angle of incidence at least equal to or greater than the critical angle of incidence so as to be internally reflected therefrom back toward the first substantially planar surface. The angle of incidence of the reflected beam with respect to the first substantially planar surface is less than the critical angle of incidence thereby resulting in the beam of light being refracted at the first substantially planar surface as it exits from the optical prism. A cross-sectional dimension of the exiting beam is in this manner reduced along one of two mutually perpendicular cross-sectional axes thereacross. In addition, the optical center axis of the beam of light incident to the prism is substantially parallel to the optical center axis of the beam of light exiting from the prism.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

FIG. 1 is a side view of the prismatic element of the optical system of this invention;

FIG. 2 is a side view of an alternate embodiment of the optical system of this invention comprising the prismatic element of FIG. 1 in optical alignment with a lateral shear prism; and FIG. 3 is a side view of still another embodiment for the optical system of this invention showing two of the prismatic elements of FIG. 1 arranged in serial optical alignment with respect to each other.

DESCRIPTION OF THE PREFERRED EMBODIMENT

Referring now to FIG. 1, there is shown the optical system of this invention in its simplest form comprising an anamorphic prism 10 within an air environment for affecting changes in the cross-sectional dimension in a beam of light along one of two mutually perpendicular cross-sectional axes. The anamorphic optical prism 10 comprises a first substantially planar polished surface 12 inclined to a second substantially planar polished surface 14 at an acute angle $\theta$. The acute angle $\theta$ is subtended by a third substantially planar polished surface 16 positioned to receive an incident beam of light having outside rays graphically illustrated at 18 and 20 and a central ray graphically illustrated at 22. As will be readily understood, the incident beam of light is substantially collimated and may comprise either coherent laser light or incoherent achromatic or monochromatic light. The cross section of the incident light beam can be understood as being generally circular having a diameter, or width dimension $W_1$ in the ZY plane which is normal to the surface of the drawing. The center ray 22 of the incident light beam is illustrated as being at a height H above the XZ plane which is normal to the surface of the drawing and coincident with the planar polished surface 14.

The angle of incidence of the light beam as represented by the rays 18, 20 and 22 to the third planar polished surface 16 is preferably 90 degrees thereby resulting in a straight transmission of the light beam through the optical prism 10 to the first planar polished surface 12. The beam of light thereafter impinges upon the first planar polished surface 12 at an angle of incidence at least equal to or greater than the critical angle of incidence so as to be totally internally reflected therefrom. The beam of light internally reflected by the first planar polished surface 12 thereafter impinges upon the second planar surface 14 at an angle of incidence at least equal to or greater than the critical angle of incidence so as to be also totally internally reflected therefrom back toward the first planar polished surface 12. The light beam is thus reflected from the second planar polished surface 14 back toward the first planar polished surface 12 at an angle of incidence less than the critical angle of incidence so that the beam of light is refracted at the first planar polished surface 12 and exits from the optical prism as graphically represented by the rays 18', 20' and 22' in a direction substantially parallel to the direction of the incident light beam. The parallel relationship between the incident and exiting light beams is maintained for a selected wavelength of light; however, as a result of the intrinsic dispersion of the refractive index of the optical material, slight deviations from this parallel relationship will occur as a function of changes in the wavelength. Such slight deviations from parallelism may be corrected by rotating the entire prism with respect to the Z axis. The exiting light beam has a narrow width $W_2$ along the Y axis while retaining the same width $W_1$ along the Z axis which is normal to the plane of the drawing. In addition, the center ray 20' of the light beam exits at a lower height h above the XZ plane. Thus, in this manner the cross-sectional dimensions of the light beam are changed from a circular to an elliptical shape.

The optical prism 10 may be made from any one of a variety of standard optical glasses or materials or alternatively from silicon, germanium or other well-known special materials when the light beam comprises infrared light. Alternatively, the optical prism may be made from magnesium fluoride or calcium fluoride when the light beam comprises ultraviolet light. In addition, any standard quartz glass could also be used. The refractive index for the aforementioned materials is preferably selected from a range in the order of 1.35 to 4. The compression ratio f of the optical prism 10 equals the width $W_2$ of the output light beam along the Y axis divided by the width $W_1$ along the Y axis of the input light beam. The compression ratio f for the optical prism of this invention is also related to the refractive index N by the following relationship:

$$f = \frac{1}{2 + \frac{1}{N}}.$$

The refractive index N of the optical prism is also related to the acute angle $\theta$ by the following relationship from which it becomes apparent that $\theta$ must be less than 30 degrees:

$$N = \frac{\cos\theta}{\cos(3\theta)}$$

Thus, it can be now readily appreciated that the selection of any one of the three aforementioned parameters N, f, $\theta$ will determine the remaining two parameters for the right angle prism of FIG. 1. For example, if the designer should select a desired compression ratio f, then the refractive index and acute angle $\theta$ will be determined in accordance with the aforementioned relationships. Conversely, should the designer first choose a specific refractive index N, then the compression ratio f and the acute angle $\theta$ will be determined in accordance with the aforementioned relationships. As previously discussed, the aforementioned relationships are applicable only in the case where the optical prism 10 is a right angle prism although the scope of the invention is by no means limited to a right angle prism.

The height h of the center ray 22' of the output light beam emanating from the optical prism 10 which is substantially less than the height H of the center ray 22 of the input light beam is related to the height H of the center ray 22 of the input light beam by the relationship h=fH. Referring now to FIG. 2, there is shown an optical system comprising the optical prism 10 of FIG. 1 in optical alignment with a laterally shearing prism 24 so as to raise the height of the center ray 22' of the output light beam as shown at 22'' to the same height H as the center ray 22 of the input light beam to the optical prism 10. In this manner the center axis of the input and output light beams are brought into coalignment with respect to each other by the use of a simple laterally shearing prism as shown at 24.

Referring now to FIG. 3, there is shown an arrangement utilizing two identical anamorphic optical prisms 10 and 10' arranged in optical alignment with respect to each other to affect an overall light beam compression equal to the light beam compression provided by the first optical prism 10 multiplied by the light beam compression provided by the second optical prism 10'. As is readily apparent, the second optical prism 10' may be identical in all respects to the first optical prism 10 including first and second substantially planar polished surfaces 12', 14' inclined to one another at an acute angle $\theta'$. The acute angle $\theta'$ is also subtended by a third substantially planar polished surface 16' positioned to receive the beam of light exiting from the first prism 10. The arrangement of the prisms 10 and 10' as illustrated in FIG. 3 also operates to raise the height of the central ray 22' of the output light beam into coincidence with the central ray 22 of the input light beam as accomplished by the laterally shearing prism 24 as shown in FIG. 2. Although the two prisms 10, 10' have been illustrated as being identical, it will be well understood that they need not be identical and may alternatively have different compression ratios.

Other embodiments of the invention, including additions, subtractions, deletions, and other modifications of the preferred disclosed embodiments of the invention will be obvious to those skilled in the art and are within the scope of the following claims. For instance, as previously discussed, although the preferred embodiment has been described as a right angle prism the invention is by no means so limited and other nonright angle prisms may also be utilized. In addition, although the optical system of FIGS. 1–3 has been described as a light beam compressor, it would be equally apparent that the system could also be used for light beam expansion simply by reversing the direction in which the light beam travels through the optical elements.

What is claimed is:

1. An optical system for effecting changes in the cross-sectional dimension of a beam of light along one of two mutually perpendicular cross-sectional axes thereacross comprising:

at least one optical prism comprising first and second substantially planar polished surfaces inclined to one another at an acute angle, said acute angle being subtended by a third substantially planar polished surface positioned to receive the incident beam of light, said first planar surface being inclined with respect to said third planar surface such that the beam of light incident to said third planar surface thereafter impinges upon said first planar surface at an angle of incidence at least equal to or greater than the critical angle of incidence so as to be internally reflected therefrom, said second substantially planar surface being inclined with respect to said first and third substantially planar surfaces such that the beam of light internally reflected by said first planar surface thereafter impinges upon said second planar surface at an angle of incidence at least equal to or greater than the critical angle of incidence so as to be internally reflected therefrom back toward said first substantially planar surface at an angle of incidence less than the critical angle of incidence thereby resulting in the beam of light being refracted at said first substantially planar surface as it exits from said optical prism, the cross-sectional dimension of the exiting beam being reduced along one of two mutually perpendicular cross-sectional axes thereacross.

2. The optical system of claim 1 wherein the optical center axis of the beam of light incident to said prism is substantially parallel to the optical center axis of the beam of light exiting from said prism.

3. The optical system of claim 2 further comprising a laterally shearing prism in optical alignment with said optical prism for shifting the center axis of the beam of light exiting from said optical prism into coalignment with the center axis of the beam of light incident to said optical prism.

4. The optical system of claim 2 wherein said third substantially planar surface is inclined at a substantially right angle with respect to said second substantially planar surface.

5. The optical system of claim 4 wherein the ratio of the reduced dimension of the exiting beam divided by the original dimension of the incident beam defines the compression ratio f of said optical system and wherein the compression ratio f is related to the refractive index N of said optical prism by the relationship $$f = \frac{1}{2 + 1/N}.$$

6. The optical system of claim 4 wherein said acute angle equals $\theta$ and wherein $\theta$ is related to the refractive index N of said optical prism by the relationship $$N = \frac{\cos \theta}{\cos (3\theta)}.$$

7. The optical system of claim 4 including a second optical prism comprising first and second substantially planar polished surfaces inclined to one another at an acute angle, said acute angle being subtended by a third substantially planar polished surface positioned to receive the beam of light exiting from said first prism, said first planar surface of said second prism being inclined with respect to said third planar surface of said second prism such that the beam of light incident to said third planar surface of said second prism thereafter impinges upon said first planar surface of said second prism at an angle of incidence at least equal to or greater than the critical angle of incidence so as to be internally reflected therefrom, said second substantially planar surface of said second prism being inclined with respect to said first and third substantially planar surfaces of said prism such that the beam of light internally reflected by said first planar surface of said second prism thereafter impinges upon said second planar surface of said second prism at an angle of incidence at least equal to or greater than the critical angle of incidence so as to be internally reflected therefrom back toward said first substantially planar surface of said second prism at an angle of incidence less than the critical angle of incidence thereby resulting in the beam of light being refracted at said first substantially planar surface of said second prism as it exits from said second optical prism, the cross-sectional dimension of the beam of light exiting from said second prism being further reduced along the same cross-sectional axis reduced by said first prism.

8. The optical system of claim 7 wherein said second prism operates to shift the center axis of the beam of light exiting therefrom into coalignment with the center axis of the beam of light incident to said first optical prism.

* * * * *